(12) United States Patent
Kishi et al.

(10) Patent No.: US 9,109,977 B2
(45) Date of Patent: Aug. 18, 2015

(54) OPTICAL FIBER CHARACTERISTICS MEASUREMENT DEVICE AND METHOD

(75) Inventors: Masato Kishi, Bunkyo-ku (JP); Kazuo Hotate, Bunkyo-ku (JP); Takashi Yari, Minato-ku (JP); Yoshihiro Kumagai, Musashino (JP)

(73) Assignees: THE UNIVERSITY OF TOKYO, Tokyo (JP); MITSUBISHI HEAVY INDUSTRIES, LTD, Tokyo (JP); YOKOGAWA ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 13/982,423

(22) PCT Filed: Jan. 27, 2012

(86) PCT No.: PCT/JP2012/051754
§ 371 (c)(1),
(2), (4) Date: Jul. 29, 2013

(87) PCT Pub. No.: WO2012/105429
PCT Pub. Date: Aug. 9, 2012

(65) Prior Publication Data
US 2013/0308123 A1     Nov. 21, 2013

(30) Foreign Application Priority Data
Jan. 31, 2011 (JP) ................................. 2011-018951

(51) Int. Cl.
*G01M 11/00* (2006.01)
*G01D 5/353* (2006.01)
(52) U.S. Cl.
CPC ........... *G01M 11/33* (2013.01); *G01D 5/35348* (2013.01); *G01M 11/39* (2013.01)

(58) Field of Classification Search
USPC ............................. 356/73.1; 385/21, 24, 128
See application file for complete search history.

(56) References Cited

U.S. PATENT DOCUMENTS

| 6,055,044 A * | 4/2000 | Uchiyama et al. ............ 356/73.1 |
| 2003/0007142 A1 * | 1/2003 | Hotate et al. ................. 356/73.1 |
| 2011/0032517 A1 * | 2/2011 | Hotate et al. ................. 356/73.1 |

FOREIGN PATENT DOCUMENTS

| EP | 2246685 A1 * | 11/2010 |
| JP | 3607930 B2 | 1/2005 |
| JP | 3667132 B2 | 7/2005 |

OTHER PUBLICATIONS

International Search Report for PCT/JP2012/051754, dated Apr. 17, 2012.

*Primary Examiner* — Sang Nguyen
(74) *Attorney, Agent, or Firm* — Sughrue Mion, PLLC (57) ABSTRACT

Provided is an optical fiber characteristics measurement device that is provided with: a light source for emitting laser light modulated by a specified modulation frequency; an incident means for receiving the laser light from the light source as continuous light and pulse light from one end and the other end of an optical fiber, respectively; and a light detector for detecting light emitted from the optical fiber, the optical fiber characteristics measurement device measuring the characteristics of the optical fiber using the detection results of the light detector, wherein the optical fiber characteristics measurement device is characterized in being provided with a synchronous detector that extracts, from among the detection signals output from the light detector, detection signals obtained by detecting the light in the vicinity of a measurement point set in the optical fiber, and synchronously detects the extracted detection signals using a synchronization signal having a specified period.

5 Claims, 6 Drawing Sheets

OPTICAL FIBER CHARACTERISTICS MEASUREMENT DEVICE AND METHOD

CROSS REFERENCE TO RELATED APPLICATIONS

This application is a National Stage of International Application No. PCT/JP2012/051754 filed Jan. 27, 2012, claiming priority based on Japanese Patent Application No. 2011-018951, filed on Jan. 31, 2011, the contents of which are incorporated herein by reference in their entirety.

TECHNICAL FIELD

The present invention relates to an optical fiber characteristics measurement device and method.

Priority is claimed on Japanese Patent Application No. 2011-018951, filed on Jan. 31, 2011, the content of which is incorporated herein by reference.

BACKGROUND ART

All patents, patent applications, patent publications, scientific articles, and the like, which will hereinafter be cited or identified in the present application, will hereby be incorporated by reference in their entirety in order to describe more fully the state of the art to which the present invention pertains.

An optical fiber characteristics measurement device, as is widely known, is a device that inputs continuous light or pulse light into an optical fiber, receives scattered light or reflected light that occurs within the optical fiber, and measures temperature distribution, strain distribution, and other characteristics in the longitudinal direction of the optical fiber. In this optical fiber characteristics measurement device, because the received scattered light or reflected light varies in response to physical quantities (for example, temperature and strain) that influence the optical fiber, the optical fiber itself is used as a sensor.

Patent Document 1 noted below discloses an optical fiber characteristics measurement device in which frequency-modulated continuous light (pump light and probe light) is sent into each respective end of the optical fiber, thereby forming periodic correlation peaks between the pump light and the probe light along the optical fiber, a characteristic of the optical fiber being measured by utilizing the property that the probe light is amplified by the stimulated Brillouin scattering only a positions of the correlation peaks. This optical fiber characteristics measurement device, by receiving amplified probe light at each position while varying the correlation peak positions within the optical fiber, can measure the characteristics of an optical fiber in the longitudinal direction.

Patent Document 2 discloses an optical fiber characteristics measurement device in which frequency-modulated continuous light (probe light) and pulse light (pump light) are sent into one and into the other end of an optical fiber, causing successive correlation peaks in accordance with the position of the pump light that propagates within the optical fiber, so as to obtain only light (stimulated Brillouin scattered light) in the vicinity of a measurement point of the light exiting from the optical fiber, so as to measure the characteristics of the optical fiber at the measurement point. This optical fiber characteristics measurement device adjusts the modulation frequency of the probe light and the pump light and the timing of receiving the light exiting from the optical fiber, so as to move the measurement point, thereby enabling measurement of the characteristics at an arbitrary position along the longitudinal direction of the optical fiber.

PRIOR ART DOCUMENTS

Patent Documents

[Patent Document 1] Japanese Patent (Granted) Publication No. 3667132
[Patent Document 2] Japanese Patent (Granted) Publication No. 3607930

DISCLOSURE OF INVENTION

Problems to be Solved by the Invention

The optical fiber characteristics measurement device disclosed in Patent Document 2 has a timing adjuster in the front end of the optical detector that receives light exiting from the optical fiber and, by separating out light exiting from the optical fiber by the timing adjuster, receives at the optical detector only light from the vicinity of the measurement point. An optical switch that applies an LN (lithium niobate) modulator using an electro-optical effect, for example, implements such a timing adjuster (Pockels effect).

The above-noted optical switch can switch between the on state (state that passes light) and the off state (state that blocks light) at a high speed, and can, for example, also separate out light exiting from the optical fiber with a time interval of approximately several nanoseconds. Thus, if an optical switch such as this is used as a timing adjuster, an optical fiber characteristics measurement device having a high spatial resolution of approximately 1 cm can be achieved. However, the above-noted optical switch has a large insertion loss, has polarization dependency, and is expensive. For this reason, it can be envisioned that the following problems might occur in the future in improving the spatial resolution and reducing the cost of an optical fiber characteristics measurement device.

(1) Worsening of Measurement Accuracy

Because the signal level (intensity of the received light signal) obtained by an optical fiber characteristics measurement device decreases as the spatial resolution increases, if the spatial resolution is made high, the S/N ratio (signal-to-noise ratio) inevitably decreases. Because the above-described optical switch has a high insertion loss of approximately 3 to 5 dB and further decreases the S/N ratio, an attempt to improve the spatial resolution of the optical fiber characteristics measurement device has the problem of causing a worsening of the measurement accuracy.

(2) Worsening of Stability and Reproducibility

The above-noted optical switch has polarization dependency, whereby the intensity of the passed light varies in accordance with the polarization direction of the incident light and, according to this characteristic, the insertion loss of the optical switch also varies in accordance with the polarization direction of the incident light. As a result, if an attempt is made to improve the spatial resolution of the optical fiber characteristics measurement device, there is the problem that the above-noted optical switch is a factor in worsening the measurement accuracy and a factor in worsening the stability and reproducibility of measurements.

(3) Other Problems

Although the above-noted optical switch often has a control device that performs feedback control of a bias voltage for the purpose of preventing temperature variations and time variations of the operating characteristics, this not only makes the constitution complex, but also, with a control signal for feedback control being superimposed on the light exiting from the optical fiber, has the problem of being a factor in lowering the S/N ratio. Also, because the above-noted optical switch is itself expensive, there is a problem of a disadvantage in terms of trying to reduce the cost of the optical fiber characteristics measurement device.

The present invention was made in consideration of the above-noted situation, and has an object to provide an optical fiber characteristics measurement device and method that, without leading to a worsening of measurement accuracy, or a worsening of stability and reproducibility, can improve the spatial resolution and reduce the cost.

Means for Solving the Problems

To solve the above-described problems, an optical fiber characteristics measurement device (1,2) in accordance with the present invention may include: a light source (11) configured to emit a laser light modulated by a prescribed modulation frequency; a light inputting means (12, 13, 15, 16) configured to cause the laser light from the light source to enter one end and another end of an optical fiber (14) as continuous light (L1) and pulse light (L2), respectively; and a light detector (17) configured to detect light exiting from the optical fiber, and to measure a characteristic of the optical fiber by using a detection result of the light detector, characterized in that the optical fiber characteristics measurement device comprises: a synchronous detection device (18, 30) configured to separate out, of a detection signal (D1) output from the light detector, a detection signal obtained by detecting light in the vicinity of a measurement point set in the optical fiber, and to detect synchronously a detection signal separated out by using a synchronization signal (SY, SY1) having a prescribed period.

According to the present invention, the following steps are performed; separating out a detection signal obtaining by detecting light in the vicinity of the measurement point set in an optical fiber from a detection signal output from a light detector; and synchronously detecting the separated out detection signal using a synchronization signal having a prescribed period.

Also, in the optical fiber characteristics measurement device in accordance with the present invention, the synchronous detection device may include: a timing adjuster (18a) configured to separate out by passing, of the detection signal output from the light detector, a detection signal obtained by detecting light in the vicinity of a measurement point set in the optical fiber; and a synchronous detector (18b) configured to use the synchronization signal to synchronously detect the detection signal passed through the timing adjuster.

Also, in the optical fiber characteristics measurement device in accordance with the present invention, an operating period of the timing adjuster may be a period that is one-half a period of the synchronization signal.

Also, in the optical fiber characteristics measurement device in accordance with the present invention, the synchronous detection device may include: an inverter (21b) configured to output an inverted signal that is the detection signal output from the light detector, with the polarity thereof inverted; a non-inverter (21a) configured to output a non-inverted signal that is the detection signal output from the light detector, with the polarity thereof not inverted; a switching unit (31) configured to separate out by alternately outputting the inverted signal output from the inverter and the non-inverted signal output from the non-inverter at a timing of the output from the light detector of a detection signal obtained by detecting light in the vicinity of the measurement point set in the optical fiber; and a lowpass filter (24) configured to filter a signal (S1) output from the switching unit.

Also, in the optical fiber characteristics measurement device in accordance with the present invention, a period of the pulse light input to the other end of the optical fiber may be set to at least two times an amount of time required for the pulse light to make a round trip from one end to the other end of the optical fiber, and a period of the synchronization signal may be the same as the period of the pulse light being input to the other end of the optical fiber.

A method of measuring a characteristics of an optical fiber in accordance with the present invention may include: inputting laser light modulated by a prescribed modulation frequency to one end and another end of the optical fiber (14) as continuous light (L1) and pulse light (L2), respectively; and detecting with a light detector (17) light exiting from the optical fiber, characterized in that the method comprises: separating out, of a detection signal output from the light detector, a detection signal obtained by detecting light in the vicinity of a measurement point set in the optical fiber; and synchronously detecting a detection signal separated out by using a synchronization signal having a prescribed period.

Effects of the Invention

According to the present invention, by separating out a detection signal obtaining by detecting light in the vicinity of the measurement point set in an optical fiber from a detection signal output from a light detector, and synchronously detecting the separated out detection signal using a synchronization signal having a prescribed period, it is possible to achieve the effect of improving the spatial resolution and reducing cost, without leading to a worsening of measurement accuracy or a worsening of stability and reproducibility.

PREFERRED EMBODIMENTS FOR CARRYING OUT THE INVENTION

An optical fiber characteristics measurement device and method in accordance with preferred embodiments of the present invention will be described in detail below, with references made to the drawings. The descriptions of preferred embodiments of the present invention to follow are merely specific descriptions of the invention set forth in the attached claims and equivalents thereto, and it will be clear to a person skilled in the art, based on the present disclosure, that these are not intended to impose restrictions.

First Preferred Embodiment

Figure 1:
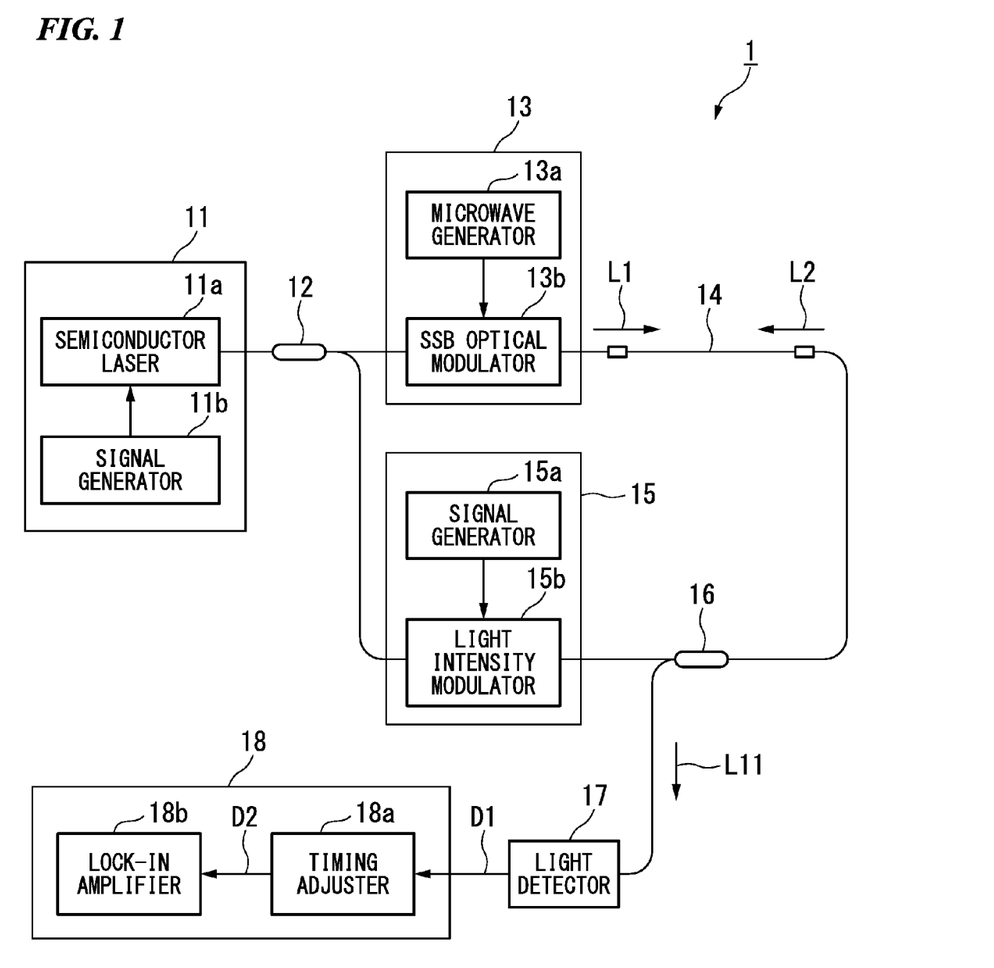
FIG. 1 is a block diagram illustrating the constitution of the main part of an optical fiber characteristics measurement device in accordance with a first preferred embodiment of the present invention.

FIG. 1 is a block diagram illustrating the constitution of the main part of an optical fiber characteristics measurement device in accordance with a first preferred embodiment of the present invention. As shown in FIG. 1, the optical fiber characteristics measurement device 1 of the first preferred embodiment has a light source 11, an optical splitter 12 (light inputting means), an optical modulator 13 (light inputting means), an optical fiber 14, a pulse modulator 15 (light inputting means), a directional coupler 16 (light inputting means), a light detector 17, and a synchronous detection device 18, and measures the characteristics (for example temperature distribution or strain distribution) of the optical fiber 14 in the longitudinal direction.

The light source 11 has a semiconductor laser 11a and a signal generator 11b, and emits laser light modulated by a prescribed modulation frequency $f_m$. In this case, the semiconductor laser 11a that is used can be, for example, an MQW DFB (multi-quantum well, distributed feedback) laser diode that is compact and emits laser light having a narrow spectral width. The signal generator 11b outputs to the semiconductor laser 11a a sinewave signal (modulation signal) that frequency modulates the laser light exiting from the semiconductor laser 11a by the modulation frequency $f_m$. The optical splitter 12 splits the laser light exiting from the light source 11 into two, for example, with a 1:1 intensity ratio.

The optical modulator 13 has a microwave generator 13a and an SSB (single sideband) optical modulator 13b, and modulates (shifts the light frequency of) one of the laser lights split by the optical splitter 12 to generate a sideband (single sideband) with respect to the center frequency of the laser light. In the first preferred embodiment, the single sideband on the low-frequency side is taken as the output from the optical modulator 13. The microwave generator 13a outputs a microwave signal having the frequency of the frequency shift imparted to one of the laser lights split by the optical splitter 12. The SSB optical modulator 13b generates a single sideband signal having a frequency difference with respect to the center frequency of the input light that is equal to the frequency of the microwave signal output from the microwave generator 13a. The frequency of the microwave signal output from the microwave generator 13a is variable. The light modulated by the optical modulator 13 is input as the probe light L1 (continuous light) into the optical fiber 14 from one end thereof.

The pulse modulator 15 has a signal generator 15a and a light intensity modulator 15b, and generates a pulse light by making the other laser light split by the optical splitter 12 into a pulse. The signal generator 15a outputs a timing signal that establishes the timing of making the laser light into a pulse light. The light intensity modulator 15b is, for example, an EO (electro-optical) switch, which forms the laser light from the optical splitter 12 into a pulse light at a timing that is established by the timing signal output from the signal generator 15a.

In this case, the pulse modulator 15 generates a pulse light with the period T given by the following Equation (1) and having a pulse width $t_{pw}$ given by the following Equation (2).

In Equation (1) and Equation (2) below, L is the length of the optical fiber 14 (from one end to the other end), n is the refractive index of the optical fiber 14, c is the speed of light, $d_m$ is the interval of the correlation peaks formed in the optical fiber 14, and $f_m$ is the modulation frequency of the laser light exiting from the light source 11.

$$T \geq 2 \times (2 \times L)/(c/n) \quad (1)$$

$$t_{pw} = (2 \times d_m)/(c/n) = 1/f_m \quad (2)$$

That is, from the above Equation (1), the period T with which the pulse modulator 15 generates the pulse light is set to at least two times the amount of time required for the pulse light to make a round trip between one end and the other end of the optical fiber 14.

The directional coupler 16 inputs laser light that has been made pulse light and output from the pulse modulator 15 as a pump light L2 into the optical fiber 14 from the other end thereof, and causes light (detection light L11) that includes a probe light L1 that has propagated through and exited from the other end of the optical fiber 14 to be incident toward the light detector 17. The stimulated Brillouin scattering phenomenon occurring within the optical fiber 14 influences the intensity of the detection light L11.

The light detector 17 has, for example, a high-sensitivity light-receiving element such as an avalanche photodiode, detects (receives) the above-noted detection light L11 (light exiting from the other end of the optical fiber 14 via the directional coupler 16), and outputs a detection signal D1. In FIG. 1, although omitted from the illustration, the light detector 17 has, in addition to the above-noted light-receiving element, a light wavelength filter, and selects and detects, of the probe light L1 from the detection light L11, the power of only light of the sideband on the low-frequency side. In the first preferred embodiment, because the SSB optical modulator 13b is used, the above-noted light wavelength filter may be omitted. By providing the light wavelength filter, however, although there is an increase in cost, because unwanted frequency components can be suppressed, the measurement accuracy can be improved.

The synchronous detection device 18 has a timing adjuster 18a and a lock-in amplifier 18b (synchronous detector) and synchronously detects the detection signal D1 output from the light detector 17. Specifically, the synchronous detection device 18, of the detection signal D1 output from the light detector 17, detects and separates out light that includes stimulated Brillouin scattered light occurring at the measurement point set within the optical fiber 14 and in the vicinity thereof, and uses a synchronization signal SY (refer to FIG. 2 and FIG. 4) having a prescribed period to synchronously detect the separated out detection signal D2.

The timing adjuster 18a is implemented by, for example, an electrical switch (high-speed analog switch) that can switch at high speed between the on state (state in which the detection signal D1 is passed) and the off state (state in which the detection signal D1 is blocked). Of the detection signal D1 output from the light detector 17, the timing adjuster 18a separates out the detection signal detected by passing a detection signal obtained by detecting light that includes stimulated Brillouin scattered light occurring at the measurement point set within the optical fiber 14 and in the vicinity thereof. The operating period of the timing adjuster 18a is set to a period that is one-half of the period of the above-noted synchronization signal SY.

In this case, it is desirable that the timing adjuster 18a be capable of separating out the detection signal D1 with a time interval of approximately several nanoseconds and have low loss (for example, 1 dB or lower). If separation out with a time interval of approximately several nanoseconds is possible, a spatial resolution of 1 cm or better can be achieved, and if the loss is low, because there is no great reduction in the S/N ratio, measurement accuracy can be improved. By using an electrical switch as the timing adjuster 18a, compactness and low cost can be achieved. Additionally, because there is no polarization dependency as there is with an optical switch, there is no worsening of stability or reproducibility, and also it is possible to perform measurement over a wide temperature range from −40 to +80° C.

The lock-in amplifier 18b uses the above-described synchronization signal SY to synchronously detect the detection signal D2 that has passed through the timing adjuster 18a (the detection signal separated out by the timing adjuster 18a). In this case, the period of the synchronization signal SY is set to a period that is the same as the period of the pump light L2 incident to the other end of the optical fiber 14 (at least two times the amount of time required for the pulse light to make a round trip between one end and the other end of the optical fiber 14).

Figure 2:
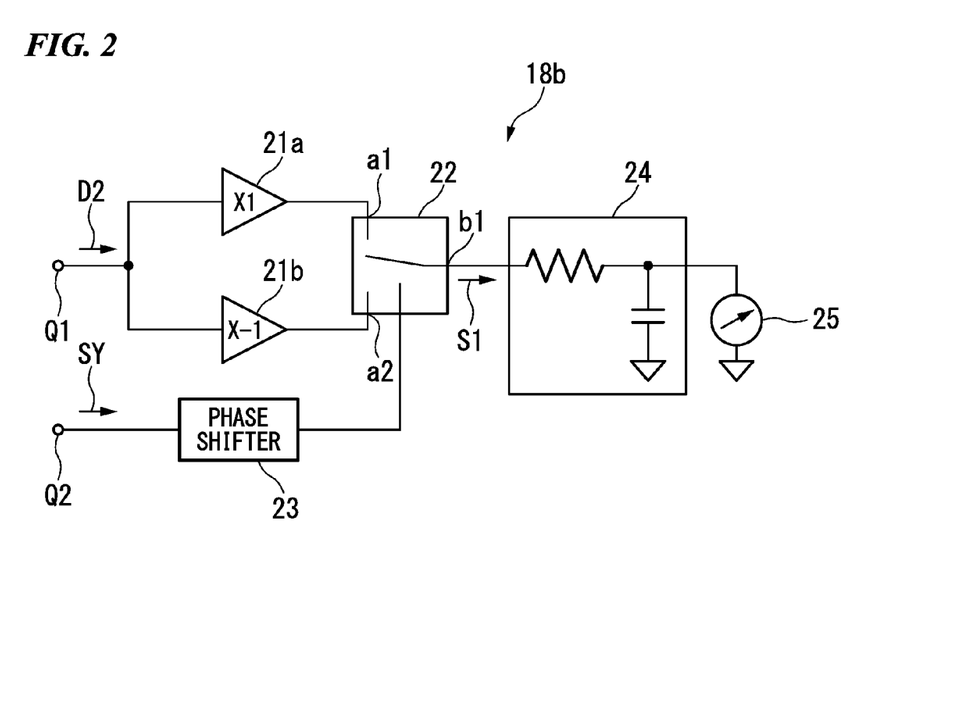
FIG. 2 is a block diagram illustrating the constitution of the main part of the lock-in amplifier of the optical fiber characteristics measurement device in accordance with the first preferred embodiment of the present invention.

FIG. 2 is a block diagram illustrating the constitution of the main part of the lock-in amplifier of the optical fiber characteristics measurement device in accordance with the first preferred embodiment of the present invention. As shown in FIG. 2, the lock-in amplifier 18b has a non-inverter 21a, an inverter 21b, a switching unit 22, a phase shifter 23, a lowpass filter 24, and a DC voltmeter 25, and uses the synchronization signal SY input to the synchronization signal input terminal Q2 to synchronously detect the detection signal D2 input to the signal input terminal Q1.

The non-inverter 21a outputs the detection signal D2 input to the signal input terminal Q1 as is, without inverting the polarity thereof, and the inverter 21b inverts and outputs the detection signal D2 input to the signal input terminal Q1. That is, the non-inverter 21a outputs a non-inverted signal that does not invert the polarity of the detection signal D2, and the inverter 21b outputs an inverted signal that inverts the polarity of the detection signal D2. The switching unit 22 has an input terminal a1, to which the output terminal of the non-inverter 21a is connected, an input terminal a2, to which the output terminal of the inverter 21b is connected, and an output terminal b1, to which the lowpass filter 24 is connected, and, based on the synchronization signal SY via the phase shifter 23, switches the output terminal b1 between the input terminals a1 and a2.

The phase shifter 23 adjusts the phase by changing the phase of the synchronization signal SY input to the synchronization signal input terminal Q2. The lowpass filter 24 filters the output signal S1 output from the output terminal b1 of the switching unit 22. Specifically, it passes low-frequency components of the output signal S1 (frequency components lower than the cutoff frequency) and blocks high-frequency components that are above the cutoff frequency. The DC voltmeter 25 measures the voltage (DC voltage) value of the signal output from the lowpass filter 24.

In the above-noted constitution, the optical splitter 12 splits laser light that is frequency modulated with the modulation frequency of $f_m$ when it is incident from the light source 11. One part of the laser light split by the optical splitter 12 is input to the optical modulator 13 and is modulated by the SSB optical modulator 13b, thereby generating a single sideband with respect to the center frequency of the laser light. The laser light (continuous light) having a signal sideband that has exited from the optical modulator 13 enters one end of the optical fiber 14 as the probe light L1.

In contrast, the other laser light split by the optical splitter 12 enters the pulse modulator 15 and becomes pulse light by intensity modulation by the light intensity modulator 15b. Specifically, a pulse light having a pulse width given by the above-described Equation (2) is generated with a period T given by the above-described Equation (1). This pulse light, via the directional coupler 16, enters the other end of the optical fiber 14 as the pump light L2.

Figure 3:
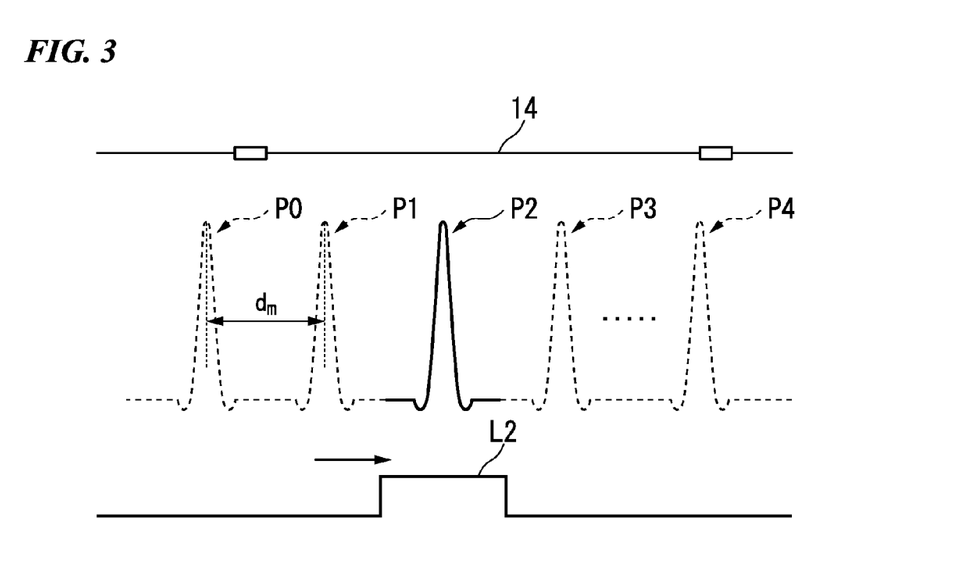
FIG. 3 is a diagram illustrating the condition in which correlation peaks occur within the optical fiber accompanying the advancing of the pump light.

When the probe light L1 as continuous light frequency modulated by the modulation frequency $f_m$ and the pump light L2 as pulse light enter the optical fiber 14, as shown in FIG. 3, as the pump light L2 propagates within the optical fiber 14, correlation peaks P0 to P4 occur at different positions in the optical fiber 14. FIG. 3 shows the condition in which correlation peaks occur within the optical fiber 14 accompanying the advancing of the pump light. In FIG. 3, to avoid having the drawing become complex, only the five correlation peaks P0 to P4 are shown. In the example shown in FIG. 3, the condition in which the pump light L2 is passing the vicinity of the correlation peak P2 is shown. In FIG. 3, the correlation peaks P0 and P1 shown by broken lines are correlation peaks that have already been passed, and the correlation peaks P3 and P4 are correlation peaks that are going to be passed as the pump light L2 advances.

The interval $d_m$ of the correlation peaks is given by the following Equation (3).

$$d_m = (c/n)/(2 \times f_m) \tag{3}$$

That is, the interval $d_m$ of the correlation peaks can be changed by changing the modulation frequency $f_m$ in the light source 11, thereby moving the positions at which the correlation peaks P1 to Pn occur. However, the position at which the zero-order correlation peak P0 occurs, at which the difference between the light paths of the probe light L1 and the pump light L2 is zero cannot be changed by changing the modulation frequency $f_m$. For this reason, as shown in FIG. 3, the position of occurrence of the zero-order correlation peak P0 is set to fall outside the optical fiber 14.

At the positions P1 to P4 of each of the correlation peaks, the probe light L1 obtains a gain by stimulated Brillouin amplification by the pump light L2. At the position of the correlation peaks, if the frequency difference between the pump light L2 and the probe light L1 is changed, with the pump light L2 as the reference, a spectrum known as the Brillouin gain spectrum (BGS) having a Lorentzian function profile is obtained, with the center frequency as the Brillouin frequency shift $V_B$. The Brillouin frequency shift $v_B$ varies and is dependent upon the material, temperature, and strain of the optical fiber 14, and it is known in particular to exhibit a linear change with respect to the strain. For this reason, by detecting the peak frequency of the Brillouin gain spectrum, it is possible to determine the amount of strain of the optical fiber 14.

The probe light L1 via the optical fiber 14 and the stimulated Brillouin scattered light that has occurred in the optical fiber 14 enter the light detector 17 as the detected light L11 via the directional coupler 16, after exiting from the other end of the optical fiber 14. Then, the non-illustrated light wavelength filter of the light detector 17 selects the light of the sideband on the low-frequency side, the intensity of which is detected, the detection signal D1 indicating the detection result being output from the light detector 17. The detection signal D1 output from the light detector 17 is input to the synchronous detection device 18 and is synchronously detected.

Figure 4:
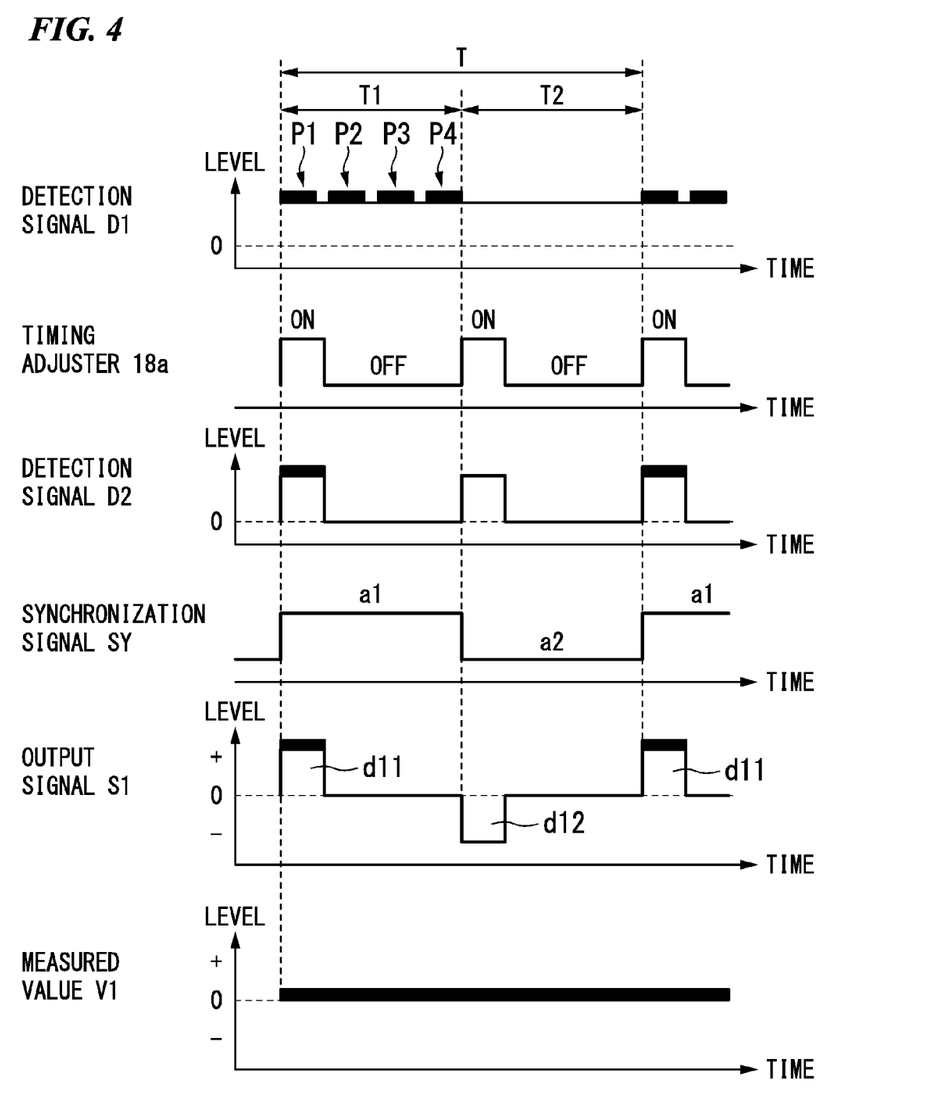
FIG. 4 is a diagram for describing the processing performed by the synchronous detection device in accordance with the first preferred embodiment of the present invention.

FIG. 4 describes the processing performed by the synchronous detection device in accordance with the first preferred embodiment of the present invention. To simplify the description that follows, the period T (period of the synchronization signal SY) with which the pump light L2 is input to the other end of the optical fiber 14 is set to be two times the amount of time required for the pump light L2 to make a round trip between one end and the other end of the optical fiber 14. If this setting is made, both the amount of time required for the pump light L2 input from the other end of the optical fiber 14 to reach the one end of the optical fiber 14 and the amount of time required for the stimulated Brillouin scattered light occurring at one end of the optical fiber to reach the other end thereof are T/4.

In the former half part T1 of one period T of the synchronization signal SY, the detection light L11 including the probe light L1 via the optical fiber 14 and the stimulated Brillouin scattered light occurring in the optical fiber 14 is input to the light detector 17. As a result, as shown in FIG. 4, the detection signal D1 that has been influenced by the stimulated Brillouin scattered light is output from the light detector 17. In FIG. 4, parts that have been influenced by stimulated Brillouin scattered light are represented by black stripes, and the parts marked by the reference symbols P1 to P4 each indicate parts that have been influenced by the stimulated Brillouin scattered light occurring at the positions P1 to P4 of the correlation peaks in FIG. 3.

In contrast, in the latter half part T2 of one period T of the synchronization signal SY, the detection light L11 including the probe light L1 via the optical fiber 14 but not including the stimulated Brillouin scattered light is input to the light detector 17. As a result, as shown in FIG. 4, the detection signal D1 that has not been influenced by stimulated Brillouin scattered light (is not marked by black stripes) is output from the light detector 17. Because the pump light L2 is input repeatedly with the period of T, the detection signal D1 influenced by the stimulated Brillouin scattered light and the detection signal D2 not influenced by the stimulated Brillouin scattered light are alternately output each T/2.

In this case, as shown in FIG. 4, the operating period of the timing adjuster 18a is set to T/2, so that, in each period thereof, a detection signal obtained by detecting light including the stimulated Brillouin scattered light occurring at the measurement point set within the optical fiber 14 and in the vicinity thereof is passed. In the example shown in FIG. 4, the measurement point is set at the position of the correlation peak P1 shown in FIG. 3, and the timing adjuster 18a switches the on and off states so that, of the detection signals D1 output from the light detector 17, the part that has been influenced by the stimulated Brillouin scattered light occurring at the position of the correlation peak P1 and the vicinity thereof is passed. This inputs the detection signal D2 shown in FIG. 4, which is separated out by the timing adjuster 18a, to the lock-in amplifier 18b.

When this detection signal D2 is input to the lock-in amplifier 18b, the detection signal D2, the polarity of which is not inverted, is output as a non-inverted signal from the non-inverter 21a, and the detection signal D2, the polarity of which is inverted, is output as an inverted signal from the inverter 21b. In this case, the synchronization signal SY having a period of T is input to the synchronization signal input terminal Q2 of the lock-in amplifier 18b, and the connection between the input terminals a1 and a2 and the output terminal b1 of the switching unit 22 is switched each T/2. As a result, as shown in FIG. 4, the output signal S1 of the switching unit 22 is the detection signal D2 in which the part not influenced by the stimulated Brillouin scattered light has its polarity inverted.

When such an output signal S1 is input to the lowpass filter 24, the signal d11 corresponding to the detection signal obtained by detecting only the probe light L1 in the former half part T1 and the signal d12 corresponding to the detection signal obtained by detecting only the probe light L1 in the latter half part T2 cancel each other out. When these signals d11 and d12 cancel each other out over a plurality of periods, the measured value V1 of the DC voltmeter 25, as shown in FIG. 4, indicates the level of the stimulated Brillouin scattered light. The characteristics of the optical fiber 14 in the length direction can be measured by repeating the above-described operation while changing the position of the measurement point set in the optical fiber 14 by changing the separation timing of the timing adjuster 18a.

As described above, in the first preferred embodiment, the light detector 17 detects the probe light L1 via the optical fiber 14 and the detection light L11 including stimulated Brillouin scattered light occurring in the optical fiber 14, and, of the detection signal D1 output from the light detector 17, the timing adjuster 18a separates out the detection signal obtained by detecting the light in the vicinity of the measurement point set in the optical fiber 14, the separated out detection signal D2 being synchronously detected by the lock-in amplifier 18b. As a result, there is no worsening of measurement accuracy or stability as in the case of using a conventional optical switch, and it is possible to improve the spatial resolution and reduce the cost.

Specifically, whereas the insertion loss when using a conventional optical switch is approximately 3 to 5 dB, if this can be reduced to approximately 1 dB, even if the spatial resolution is improved it is possible to measure the characteristics of the optical fiber 14 with high accuracy. For example, if the insertion loss is reduced from 3 dB to 1 dB, even if the spatial resolution is improved by approximately 1.5 times, good measurement accuracy is possible, and if the insertion loss is reduced from 5 dB to 1 dB, even if the spatial resolution is improved by approximately 2 times, good measurement accuracy is possible.

Second Preferred Embodiment

Figure 5:
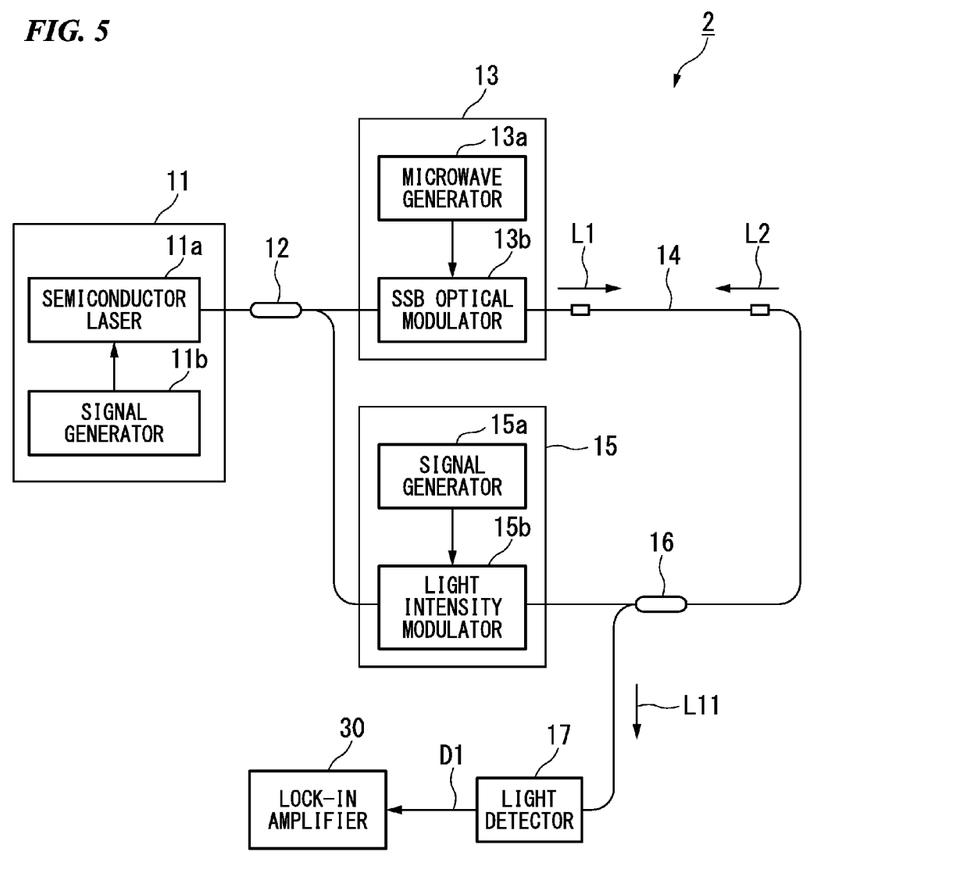
FIG. 5 is a block diagram illustrating the constitution of the main part of an optical fiber characteristics measurement device in accordance with a second preferred embodiment of the present invention.

FIG. 5 is a block diagram illustrating the constitution of the main part of an optical fiber characteristics measurement device in accordance with a second preferred embodiment of the present invention. As shown in FIG. 5, the optical fiber characteristics measurement device 2 of the second preferred embodiment differs from the optical fiber characteristics measurement device 1 of the first preferred embodiment by having a lock-in amplifier 30 (synchronous detection device) in place of the synchronous detection device 18. Whereas the optical fiber characteristics measurement device 1 of the first preferred embodiment is constituted with the timing adjuster 18a and the lock-in amplifier 18b provided as separate elements, the optical fiber characteristics measurement device 2 of the second preferred embodiment is constituted to have a lock-in amplifier 30 having the timing adjuster 18a and the lock-in amplifier 18b provided integrally.

Figure 6:
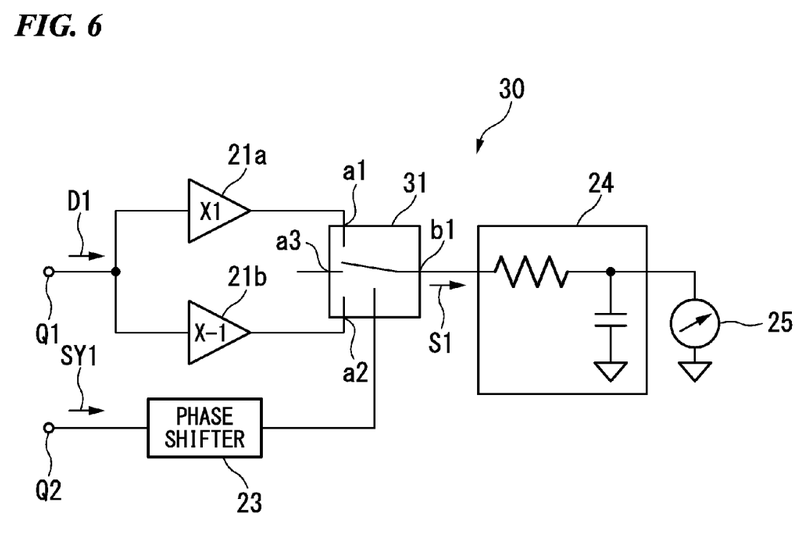
FIG. 6 is a block diagram illustrating the constitution of the main part of the lock-in amplifier of the optical fiber characteristics measurement device in accordance with the second preferred embodiment of the present invention.

FIG. 6 is a block diagram illustrating the constitution of the main part of the lock-in amplifier of the optical fiber characteristics measurement device in accordance with the second preferred embodiment of the present invention. As shown in FIG. 6, the lock-in amplifier 30 has a constitution in which a switching unit 31 replaces the switching unit 22 of the lock-in amplifier 18b shown in FIG. 2. In the lock-in amplifier 30, a synchronization signal SY1 is used in place of the synchronization signal SY shown in FIG. 2 and FIG. 4. Details of the synchronization signal SY1 will be described later.

The switching unit 31, in addition to an input terminal a1 to which the output terminal of the non-inverter 21a is connected, an input terminal a2 to which the output terminal of the inverter 21*b* is connected, and an output terminal b1 to which the lowpass filter 24 is connected, has an input terminal a3 that is electrically insulated from the input terminals a1 and a2 and, based on the synchronization signal SY1 via the phase shifter 23, switches the connection between the input terminals a1, a2, and a3 and the output terminal b1. If the input terminal a3 is electrically insulated from the input terminals a1 and a2, it may be open or shorted to ground or the like, or may be terminated. An electrical switch (high-speed analog switch), for example, similar to that used in the timing adjuster 18*a* shown in FIG. 1, may be used as the switching unit 31.

Figure 7:
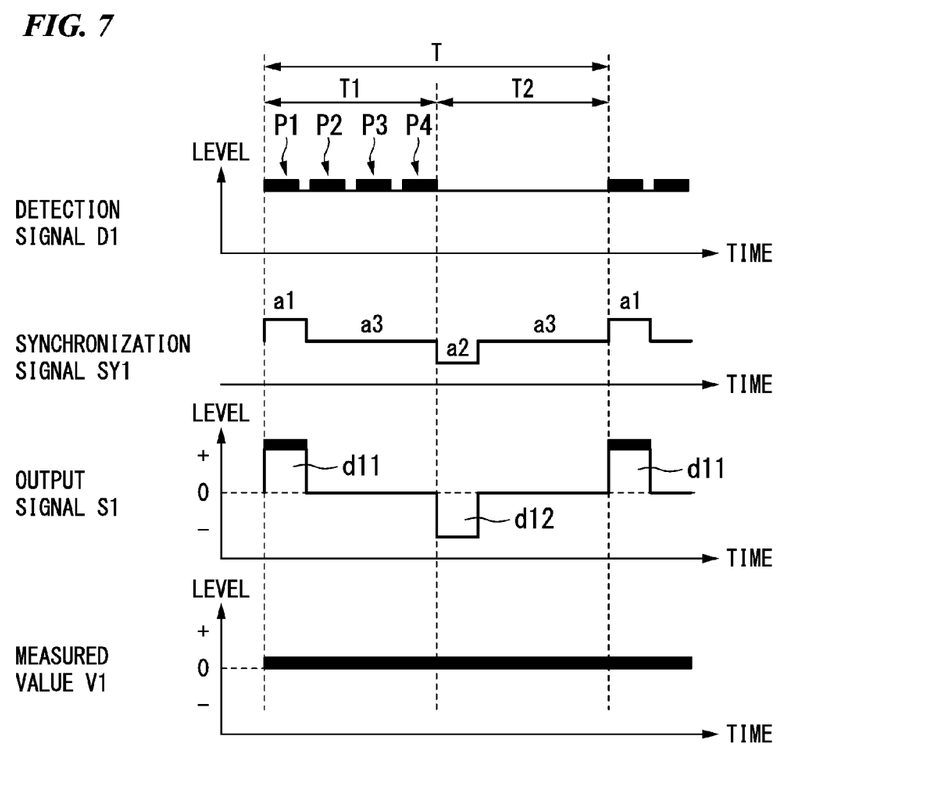
FIG. 7 is a diagram for describing the processing performed by the synchronous detection device as a lock-in amplifier in accordance with the second preferred embodiment of the present invention.

FIG. 7 describes the processing performed by the synchronous detection device as a lock-in amplifier in accordance with the second preferred embodiment of the present invention. In the second preferred embodiment as well, to simplify the description, the period T with which the pump light L2 is input to the other end of the optical fiber 14 is set to be two times the amount of time required for the pump light L2 to make a round trip between one end and the other end of the optical fiber 14. The period of the synchronization signal SY1 is the same as the period of the synchronization signal SY, in this case being the period T.

In the second preferred embodiment as well, similar to the first preferred embodiment, in the former half part T1 of one period T of the synchronization signal SY1, the detection light L11 including the probe light L1 via the optical fiber 14 and the stimulated Brillouin scattered light occurring in the optical fiber 14 is input to the light detector 17. In the latter half part T2 of one period T of the synchronization signal SY1, the detection light L11 including the probe light L1 via the optical fiber 14 but not including the stimulated Brillouin scattered light is input to the light detector 17. As a result, the detection signal D1 output from the light detector 17 is one that has been influenced by the stimulated Brillouin scattered light in the former half part T1, but is one that has not been influenced by the stimulated Brillouin scattered light in the latter half part T2, this detection signal D1 being input to the lock-in amplifier 30.

When the detection signal D1 is input to the lock-in amplifier 30, the detection signal D1, the polarity of which is not inverted, is output as a non-inverted signal from the non-inverter 21*a*, and the detection signal D1, the polarity of which is inverted, is output as an inverted signal from the inverter 21*b*. The non-inverted signal output from the non-inverter 21*a* is input to the input terminal a1 of the switching unit 31, and the inverted signal output form the inverter 21*b* is input to the input terminal a2 of the switching unit 31.

In this case, as shown in FIG. 7, the synchronization signal SY1 used in the lock-in amplifier 30 is a signal having a period of T, which is the same as the period of synchronization signal SY shown in FIG. 4. However, the synchronization signal SY1 is a signal that, during almost all of one period T, causes the connection between the input terminal a3 and the output terminal b1 of the switching unit 31, and causes connection between the input terminal a1 and the output terminal b1 of the switching unit 31 at only a specific timing in the former half part T1, and a connection between the input terminal a2 and the output terminal b1 of the switching unit 31 at only a specific timing in the latter half part T2.

Specifically, the synchronization signal SY1, in the former half part T1 of one period T, causes a connection between the input terminal a1 and the output terminal b1 of the switching unit 31 at a timing at which the detection signal D1 obtained by detecting light including the stimulated Brillouin scattered light occurring at the measurement point set in the optical fiber 14 and in the vicinity thereof is output from the light detector 17 (precisely, the timing at which the non-inverted signal of the detection signal D1 is output from the non-inverter 21*a*). In the latter half part T2 of one period T, a connection is caused between the input terminal a2 and the output terminal b1 of the switching unit 31 at only a timing similar to the timing in the former half part T1.

When the switching unit 31 performs switching by the above-described synchronization signal SY1, the switching unit 31 separates out the non-inverted signal input to the input terminal a1 and the inverted signal input to the input terminal a2. As a result, the switching unit 31 outputs an output signal S1, as shown in FIG. 7, similar to the output signal S1 shown in FIG. 4. When this output signal S1 is input to the lowpass filter 24, similar to the first preferred embodiment, the signal d11 corresponding to the detection signal obtained by detecting only the probe light L1 in the former half part T1 and the signal d12 corresponding to the detection signal obtained by detecting only the probe light L1 in the latter half part T2 cancel each other out, and the measured value V1 of the DC voltmeter 25 indicates the level of the stimulated Brillouin scattered light.

In this case, the timing of switching by the switching unit 31 changes depending upon the synchronization signal SY1. As a result, in the second preferred embodiment, the characteristics of the optical fiber 14 can be measured in the length direction, in the same manner as in the first preferred embodiment, by repeating the above-described operation while changing the position of the measurement point set in the optical fiber 14 by changing the switching timing of the switching unit 31 using the synchronization signal SY1.

As described above, in the second preferred embodiment, the lock-in amplifier 30 implements the separation out performed by the timing adjuster 18*a* and the synchronous detection performed by the lock-in amplifier 18*b* of the first preferred embodiment. As a result, similar to the first preferred embodiment, the spatial resolution can be improved, and the cost can be reduced, without a worsening of the measurement accuracy or a worsening of stability or reproducibility. Also, in the second preferred embodiment, the integration of the function of the timing adjuster 18*a* and the function of the lock-in amplifier 18*b* into the lock-in amplifier 30 is advantageous in achieving compactness and cost reduction.

Although the foregoing has been a description of an optical fiber characteristics measurement device and method in accordance with preferred embodiments of the present invention, the present invention is not restricted to the above-described preferred embodiments, and can be freely changed within the scope thereof. For example, it is desirable to adopt a constitution providing an optical delay unit and an optical isolator between the optical modulator 13 and the one end of the optical fiber 14. Providing an optical delay unit enables adjustment of the positions of the correlation peaks formed in the optical fiber 14 and, as described using FIG. 3, facilitates the setting of the position of occurrence of the zero-order correlation peak P0 outside the optical fiber 14. Providing an optical isolator, because light directed from the optical fiber 14 toward the optical modulator 13 (for example, the pump light L2) can be blocked, enables a reduction in noise and the like.

That is, the present invention is not restricted to the above-described preferred embodiments, but rather is restricted by the scope of the attached claims.

INDUSTRIAL APPLICABILITY

According to the optical fiber characteristics measurement device and optical fiber characteristics measurement method of the present invention, it is not necessary to use a relatively expensive optical switch as a timing adjuster as is conventionally done, and, using a low-cost electrical switch, it is possible to measure strain (temperature) as with conventional art.

DESCRIPTION OF THE REFERENCE SYMBOLS

1 Optical fiber characteristics measurement device
2 Optical fiber characteristics measurement device
11 Light source
12 Optical splitter
13 Optical modulator
14 Optical fiber
15 Pulse modulator
16 Directional coupler
17 Light detector
18 Synchronous detection device
18a Timing adjuster
18b Lock-in amplifier
21a Non-inverter
21b Inverter
24 Lowpass filter
30 Lock-in amplifier
31 Switching unit
D1 Detection signal
L1 Probe light
L2 Pump light
S1 Output signal
SY Synchronization signal
SY1 Synchronization signal

What is claimed is:

1. An optical fiber characteristics measurement device comprising:
a light source configured to emit a laser light modulated by a prescribed modulation frequency;
a light inputting means configured to cause the laser light from the light source to enter one end and another end of an optical fiber as continuous light and pulse light, respectively; and
a light detector configured to detect light exiting from the optical fiber, and to measure a characteristic of the optical fiber by using a detection result of the light detector,
characterized in that the optical fiber characteristics measurement device comprises:
a synchronous detection device configured to separate out, of a detection signal output from the light detector, a detection signal obtained by detecting light in the vicinity of a measurement point set in the optical fiber, and to detect synchronously a detection signal separated out by using a synchronization signal having a prescribed period,
wherein the synchronous detection device comprises:
an inverter configured to output an inverted signal that is the detection signal output from the light detector, with the polarity thereof inverted;
a non-inverter configured to output a non-inverted signal that is the detection signal output from the light detector, with the polarity thereof not inverted;
a switching unit configured to separate out by alternately outputting the inverted signal output from the inverter and the non-inverted signal output from the non-inverter at a timing of the output from the light detector of a detection signal obtained by detecting light in the vicinity of the measurement point set in the optical fiber; and
a lowpass filter configured to filter a signal output from the switching unit.

2. The optical fiber characteristics measurement device according to claim 1, wherein
a period of the pulse light input to the other end of the optical fiber is set to at least two times an amount of time required for the pulse light to make a round trip from one end to the other end of the optical fiber, and
a period of the synchronization signal is the same as the period of the pulse light being input to the other end of the optical fiber.

3. An optical fiber characteristics measurement device comprising:
a light source configured to emit a laser light modulated by a prescribed modulation frequency;
a light inputting means configured to cause the laser light from the light source to enter one end and another end of an optical fiber as continuous light and pulse light, respectively; and
a light detector configured to detect light exiting from the optical fiber, and to measure a characteristic of the optical fiber by using a detection result of the light detector,
characterized in that the optical fiber characteristics measurement device comprises:
a synchronous detection device configured to separate out, of a detection signal output from the light detector, a detection signal obtained by detecting light in the vicinity of a measurement point set in the optical fiber, and to detect synchronously a detection signal separated out by using a synchronization signal having a prescribed period, wherein
a period of the pulse light input to the other end of the optical fiber is set to at least two times an amount of time required for the pulse light to make a round trip from one end to the other end of the optical fiber, and
a period of the synchronization signal is the same as the period of the pulse light being input to the other end of the optical fiber.

4. A method of measuring a characteristics of an optical fiber, comprising:
inputting laser light modulated by a prescribed modulation frequency to one end and another end of the optical fiber as continuous light and pulse light, respectively; and
detecting with a light detector light exiting from the optical fiber,
characterized in that the method comprises:
separating out, of a detection signal output from the light detector, a detection signal obtained by detecting light in the vicinity of a measurement point set in the optical fiber;
synchronously detecting a detection signal separated out by using a synchronization signal having a prescribed period;
outputting, by an inverter, an inverted signal that is the detection signal output from the light detector, with the polarity thereof inverted;
outputting, by a non-inverter, a non-inverted signal that is the detection signal output from the light detector, with the polarity thereof not inverted;
separating out, by a switching unit, by alternately outputting the inverted signal output from the inverter and the non-inverted signal output from the non-inverter at a timing of the output from the light detector of a detection signal obtained by detecting light in the vicinity of the measurement point set in the optical fiber; and
filtering, by a lowpass filter, a signal output from the switching unit.

5. A method of measuring a characteristics of an optical fiber, comprising:
- inputting laser light modulated by a prescribed modulation frequency to one end and another end of the optical fiber as continuous light and pulse light, respectively; and
- detecting with a light detector light exiting from the optical fiber, characterized in that the method comprises:

- separating out, of a detection signal output from the light detector, a detection signal obtained by detecting light in the vicinity of a measurement point set in the optical fiber; and
- synchronously detecting a detection signal separated out by using a synchronization signal having a prescribed period, wherein
- a period of the pulse light input to the other end of the optical fiber is set to at least two times an amount of time required for the pulse light to make a round trip from one end to the other end of the optical fiber, and
- a period of the synchronization signal is the same as the period of the pulse light being input to the other end of the optical fiber.

\* \* \* \* \*